United States Patent
Wei et al.

(10) Patent No.: US 9,521,596 B2
(45) Date of Patent: Dec. 13, 2016

(54) MOBILE COMMUNICATION DEVICE FOR COLLECTING SYSTEM INFORMATION AND CELL MEASUREMENT USING DRX GAP AND AUTONOMOUS GAP

(71) Applicant: MediaTek Inc., Hsin-Chu (TW)

(72) Inventors: Yi-Chun Wei, Hsinchu (TW); Yi-Yo Lin, Taipei (TW); Hung-Wei Shih, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 79 days.

(21) Appl. No.: 14/391,477

(22) PCT Filed: May 17, 2013

(86) PCT No.: PCT/CN2013/075801
§ 371 (c)(1),
(2) Date: Oct. 9, 2014

(87) PCT Pub. No.: WO2013/170780
PCT Pub. Date: Nov. 21, 2013

(65) Prior Publication Data
US 2015/0117283 A1     Apr. 30, 2015

Related U.S. Application Data

(60) Provisional application No. 61/648,560, filed on May 17, 2012.

(51) Int. Cl.
*H04W 36/00* (2009.01)
*H04W 76/04* (2009.01)
(Continued)

(52) U.S. Cl.
CPC ........ *H04W 36/0072* (2013.01); *H04L 5/0053* (2013.01); *H04W 36/0088* (2013.01); *H04W 52/0216* (2013.01); *H04W 76/048* (2013.01)

(58) Field of Classification Search
CPC .......... H04W 76/048; H04W 36/0072; H04W 36/0088; H04W 52/0216; H04W 52/02; H04W 36/0061; H04W 52/0203; H04W 84/12; H04W 24/10; H04L 5/0053
See application file for complete search history.

(56) References Cited

U.S. PATENT DOCUMENTS 8,165,175 B2      4/2012   Wang et al.
8,331,326 B2 *  12/2012   Wang .................. H04J 11/0069
                                                                370/252
(Continued)

FOREIGN PATENT DOCUMENTS

CN          101682853 A       3/2010
CN          101683852 A       3/2010
(Continued)

OTHER PUBLICATIONS

International Search Report dated Aug. 22, 2013.
(Continued)

*Primary Examiner* — Ian N Moore
*Assistant Examiner* — Phong La
(74) *Attorney, Agent, or Firm* — McClure, Qualey & Rodack, LLP

(57) ABSTRACT

A mobile communication device and a method thereof are provided. The method, adopted by a mobile communication device connected to a serving cell, including: receiving a measurement request for a first target cell; in response to the measurement request, acquiring first timing information of first system information for a first target cell; scheduling an autonomous gap substantially corresponding to occurrence of the first system information according to the first timing information; and initiating the autonomous gap to receive the first system information from the first target cell.

13 Claims, 11 Drawing Sheets

(51) Int. Cl.
  *H04L 5/00* (2006.01)
  *H04W 52/02* (2009.01)

(56) References Cited

U.S. PATENT DOCUMENTS

| | | | |
|---|---|---|---|
| 9,220,055 B2* | 12/2015 | Shin | H04W 48/16 |
| 2009/0239533 A1* | 9/2009 | Somasundaram | H04J 11/0093 455/434 |
| 2009/0310503 A1* | 12/2009 | Tenny | H04W 68/00 370/252 |
| 2009/0318177 A1* | 12/2009 | Wang | H04W 68/025 455/515 |
| 2010/0003978 A1* | 1/2010 | Catovic | H04W 60/00 455/435.1 |
| 2010/0197298 A1* | 8/2010 | So | H04W 24/10 455/424 |
| 2010/0297955 A1* | 11/2010 | Marinier | H04W 36/0061 455/73 |
| 2010/0322169 A1* | 12/2010 | Narasimha | H04W 72/0493 370/329 |
| 2010/0323633 A1* | 12/2010 | Pani | H04W 24/10 455/67.14 |
| 2011/0117916 A1* | 5/2011 | Dahlen | H04W 48/08 455/436 |
| 2011/0171915 A1* | 7/2011 | Gomes | H04W 24/10 455/73 |
| 2011/0171985 A1* | 7/2011 | Papasakellariou | H04W 72/02 455/509 |
| 2011/0177816 A1* | 7/2011 | Hole | H04W 36/0072 455/436 |
| 2011/0292854 A1* | 12/2011 | Terry | H04L 5/001 370/311 |
| 2012/0002643 A1* | 1/2012 | Chung | H04J 11/0093 370/331 |
| 2012/0044910 A1* | 2/2012 | Maeda | H04L 5/0005 370/332 |
| 2012/0244903 A1* | 9/2012 | Fong | H04W 8/20 455/517 |
| 2013/0028126 A1* | 1/2013 | Kazmi | H04W 36/0088 370/252 |
| 2013/0267221 A1* | 10/2013 | Srinivasan | H04W 36/0088 455/422.1 |
| 2014/0112180 A1* | 4/2014 | Axmon | H04W 24/10 370/252 |
| 2014/0169347 A1* | 6/2014 | Lamazure | H04B 17/382 370/337 |
| 2014/0233408 A1* | 8/2014 | Bontu | H04W 36/0094 370/252 |

FOREIGN PATENT DOCUMENTS

| | | |
|---|---|---|
| CN | 101978728 A | 2/2011 |
| EP | 1 986 347 | 10/2008 |
| WO | WO 2008/085952 | 7/2008 |
| WO | WO 2011/126420 | 10/2011 |

OTHER PUBLICATIONS

"Measurement Gap Scheduling"; Qualcomm Europe; 3GPP TSG-RAN WG2 #54 R2-062359; Aug. 28-Sep. 1, 2006; Tallinn, Estonia; pp. 1-3.

"3rd Generation Partnership Project; Technical Specification Group Radio Access Network; Evolved Universal Terrestrial Radio Access (E-UTRA); Requirements for support of radio resource management (Release 8)"; 3GPP TS 36.133 V8.17.0 (Mar. 2012); pp. 1-337.

"3rd Generation Partnership Project; Technical Specification Group Radio Access Network; Evolved Universal Terrestrial Radio Access (E-UTRA); Radio Resource Control (RRC); Protocol specification (Release 9)"; pp. 1-255.

"Idle Gaps for Handover Measurements in E-UTRAN"; 3GPP TSG-RAN WG2 (Radio) Meeting #54 R2-062134 Tallinn, Estonia, Aug. 28-Sep. 1, 2006; pp. 1-5.

\* cited by examiner

MOBILE COMMUNICATION DEVICE FOR COLLECTING SYSTEM INFORMATION AND CELL MEASUREMENT USING DRX GAP AND AUTONOMOUS GAP

CROSS REFERENCE TO RELATED APPLICATIONS

This application is a National Phase of application Ser No. PCT/CN2013/075801, filed on May 17, 2013, which claims priority of U.S. Provisional Application No. 61/648,560, filed on May 17, 2012, and the entirety of which is incorporated by reference herein.

TECHNICAL FIELD

The present invention relates to mobile communications, and in particular, to a wireless communication device and method thereof for cell measurements.

BACKGROUND

Femto base stations, or home base stations, have attracted much attention in the wireless industry. In the Universal Terrestrial Radio Access Network (UTRAN) and the Evolved Universal Terrestrial Radio Access Network (E-UTRAN), the features associated with the femto base station such as mobility and interference management have been introduced. The femto base stations are already operational in 2G and 3G communication systems such as the Global System for Mobile communication (GSM) system and the 3GPP2 Code Division Multiple Access 2000 (CDMA 2000) system.

Access to a home base station or a group of home base stations may be under the control of the operator or the owner of the home base station, who decides whether a given user may or may not connect to that home base station. Only the subscribers to the group of the home base station are allowed to connect to the home base station, known as a closed subscriber group (CSG). In the CSG, mobility management is employed to prevent a handover of a CSG subscriber to a neighboring home base station that does not belong to the same CSG. Therefore, before initiating a handover to a target cell, the serving home base station is required to identify whether a target home base station which serves the target cell belongs to the same CSG.

In order to determine the identity and type of potential target cells, the serving home base station can instruct the CSG subscriber to collect the system information of all potential target cells and conduct a measurement regarding the potential target cells. In response to the request, the CSG subscriber can acquire system information and measurements from the potential target base stations, and return a report including the acquired information to the serving home base station. Specifically, the CSG subscriber can report a unique identifier of the target cell, known as a Cell Global Identifier (CGI), to the serving home base station. Further, the report also includes information on how well a signal from the target cell is received, based on which the serving home base station can determine whether to initiate a handover to the target cell.

The CSG subscriber can collect the system information and the measurements during a discontinuous reception (DRX) gap or an autonomous gap, of which the DRX gap is defined by the network and the autonomous gap is initiated by the CSG subscriber. The conditions for using the DRX gap and the autonomous gap to collect the system information and the cell measurements have not been established.

SUMMARY

A detailed description is given in the following embodiments with reference to the accompanying drawings.

An embodiment of a method adopted by a mobile communication device connected to a serving cell is described, comprising: receiving a measurement request for a first target cell; in response to the measurement request, acquiring first timing information of first system information for a first target cell; scheduling an autonomous gap substantially corresponding to occurrence of the first system information according to the first timing information; and initiating the autonomous gap to receive the first system information from the first target cell.

Another embodiment of a mobile communication device is provided, comprising a transceiver and a controller. The transceiver is configured to establish a connection to a serving cell, and receive a measurement request for a first target cell. The controller, coupled to the transceiver, is configured to in response to the measurement request, acquire first timing information of first system information for a first target cell, schedule an autonomous gap substantially corresponding to occurrence of the first system information according to the first timing information, and initiate the autonomous gap to receive the first system information from the first target cell.

Another embodiment of a method adopted by a mobile communication device connected to a serving cell is disclosed, comprising: in response to a measurement request for a first target cell, receiving first system information from the first target cell by DRX gaps in a first duration of time; and when the first system information is not complete and the first duration of time has been exceeded, receiving the first system information from the first target cell by an autonomous gap in a second duration of time.

BRIEF DESCRIPTION OF DRAWINGS

The present invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

It should be noted that, although the LTE system is used to illustrate various embodiments of the invention, the scope of the invention is not limited by the particular type of communication system. Other wireless communication systems, such as the Global System for Mobile Communications (GSM), General packet radio service (GPRS), Enhanced Data rates for GSM Evolution (EDGE), Universal Mobile Telecommunications System (UMTS), Code Division Multiple Access 2000 (CDMA2000), Enhanced Voice-Data Optimized (EVDO), High Speed Packet Access (HSPA), Worldwide Interoperability for Microwave Access (WiMAX), and LTE-Advanced (LTE-A), may also adopt the principle and idea of the invention within the scope of the disclosure.

As used herein, the term "base station" may also be referred to as a home base station, home access point, femto base station, femto access point, home NodeB, or home eNodeB, UTRAN FDD/TDD home NodeB, E-UTRAN TDD/FDD home eNB (eNodeB), GSM home base station, CDMA2000 home base station, High Rate Packet Data (HRPD) home base station, or WiMAX home base station. For simplicity and consistency, we will use the term base station throughout the disclosure. This term is intended to cover all types of home base station, including but not limited to those mentioned above. It should be understood that a home base station may not only be deployed in a private residence, but also in other public or private premises such as shopping malls and office buildings.

Various aspects are described herein in connection with a terminal which can be a wired or a wireless terminal. A terminal can also be referred to as a system, device, subscriber unit, subscriber station, mobile station, mobile, mobile device, remote station, remote terminal, access terminal, user terminal, terminal, communication device, user agent, user device, or user equipment. A wireless terminal may be a cellular telephone, a satellite phone, a cordless telephone, a Session Initiation Protocol (SIP) phone, Personal Digital Assistant (PDA), a handheld device having wireless connection capability, a computing device, or other processing device connected to a wireless modem.

Herein, the term "timing" should be broadly construed to include the length and/or positions of measurement gaps, in an absolute or relative sense (e.g., with respect to synchronized frames), and/or the number, duration, and/or periodicity of such gaps.

Figure 1:
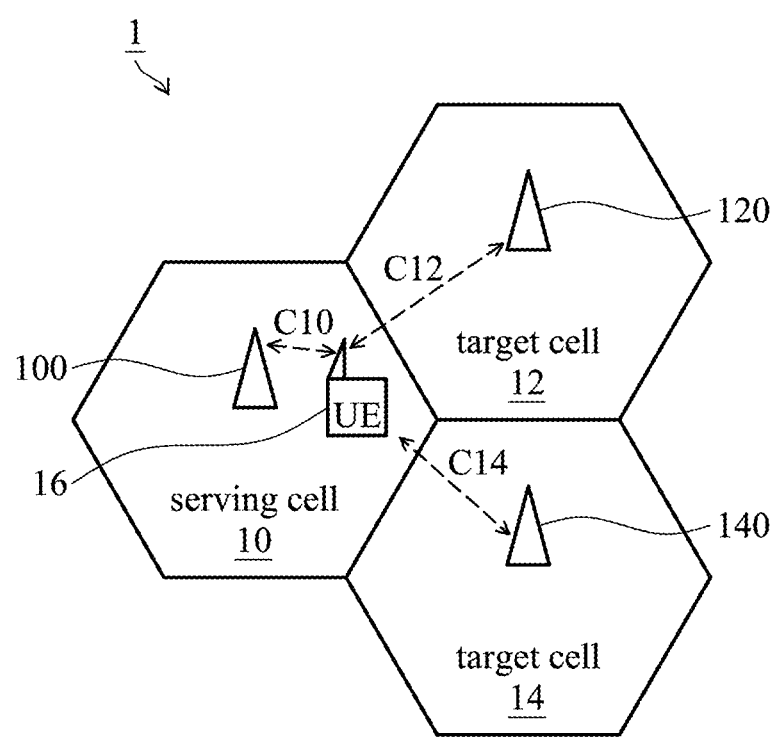
FIG. 1 is a schematic diagram of a wireless communication system 1.

FIG. 1 is a schematic diagram of a communication system environment 1, including a serving base station 10, a first target base station 12, and a second target base station 14, with the base stations 10, 12, and 14 serving radio coverage, or cells 100, 120, and 140, respectively. A UE 16 is present in the cell 100 served by the serving base station 10. The UE 16 can communicate with the base stations 10, 12, and 14 through connection $C_{10}$, $C_{12}$, and $C_{14}$, respectively. The base stations 10, 12, and 14 may belong to the same or different radio access technologies (RAT) and the same or different CSGs.

The base stations 10, 12, and 14 periodically broadcast system information (SI), which can be collected and decoded by UEs within the cell coverage area. Although only one UE and three base stations are shown in the exemplified system environment, it should be understood that any number of UEs may be served by each cell and more than three base stations may be present in the radio environment.

As the UE 16 has established a connection to the serving base station 10, the UE 16 can communicate with the base station 10 to receive network services from a service network through the serving base station 10. In a data transmitting mode, the serving base station 10 may request the UE 16 to collect and report measurements regarding the potential target base stations 12 and 14 by conducting a measurement procedure. Based on the measurement reports, the serving base station 10 can initiate handover of the UE 16 to one of the target base stations when the channel metrics of the handover target base station is favored more than that of the base station 10. The measurement procedure may concern with an intra-frequency measurement or an inter-frequency measurement.

Accordingly, the measurement procedure can be conducted by the UE 16 in a measurement gap including the DRX gap and the autonomous gap. In the case of a 3G cell, the measurement procedure involves 2 parts, i.e., collecting system information and obtaining cell measurements. In the case of a 2G cell, the measurement procedure concerns only with taking the cell measurement. The UE 16 has already obtained a Base station identity code (BSIC) and read system information for the 2G cell prior to taking the measurement procedure during the measurement gap.

The DRX gap is an idle period of a DRX cycle, during which the UE does not expect any downlink data coming from the serving base station 10. The UE 16 may tune to the target cell during the DRX gap for collecting the target cell's SI and measurements without causing disruption in the communication and connection in the serving cell 100. The DRX cycle is a periodic cycle defined by the service network. When the DRX cycle is configured, the UE 16 may be programmed with an On Duration, during which the UE monitors a physical downlink control channel (PDCCH) for possible allocations from the serving base station 10. Consequently, the UE 16 is not able to receive information from the target cell during the On Duration of the DRX cycle.

Alternatively, the UE 16 can create autonomous gap to read the SI and take the cell measurement of the target cell, while not being required to receive or transmit in the serving cell in the autonomous gap. The autonomous gap results in interruption in the downlink reception from the serving base station 10 and uplink transmission to the serving base station 10, since the UE 16 typically equips with only one set of RF circuits and can only exchange communications with a base station at a time. As a consequence, the communication toward the serving base station 10 will be degraded in the autonomous gap, and in some cases, the connection to the serving base station 10 will drop out in an extended duration of the autonomous gap.

Figure 3:
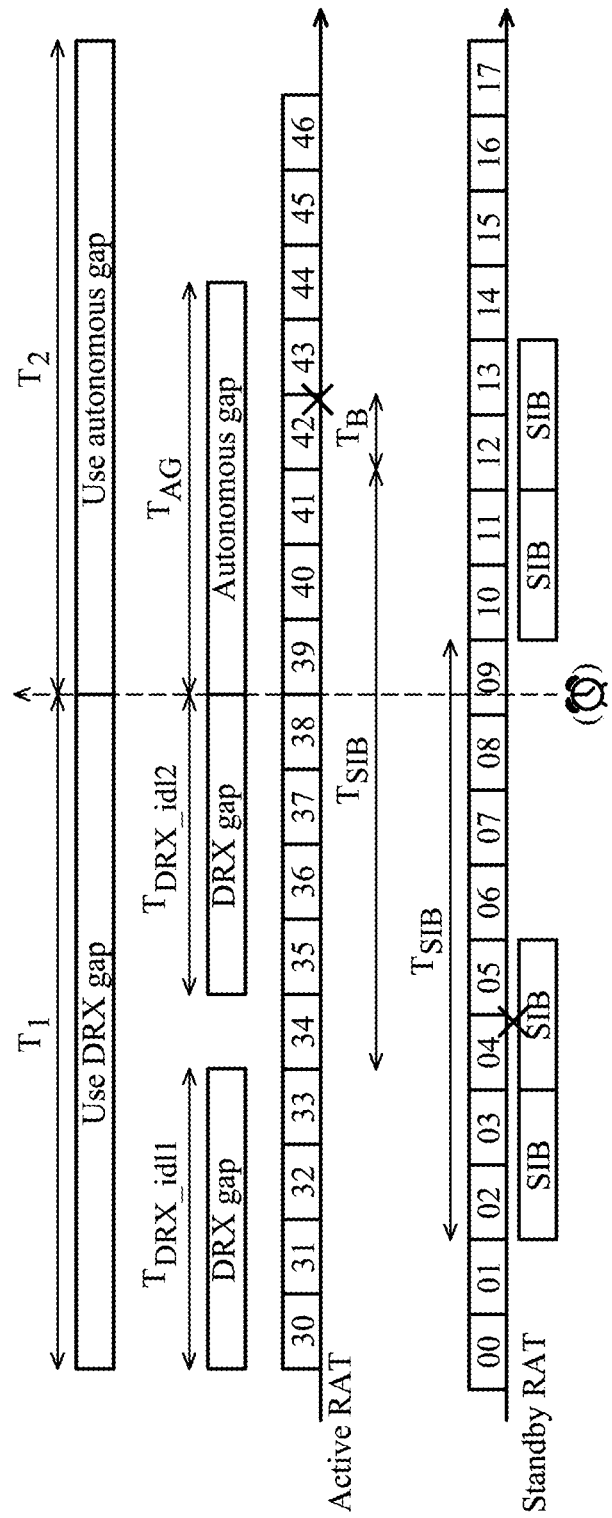
FIG. 3 is a timing diagram of a measurement procedure according to an embodiment of the invention.
Figure 5:
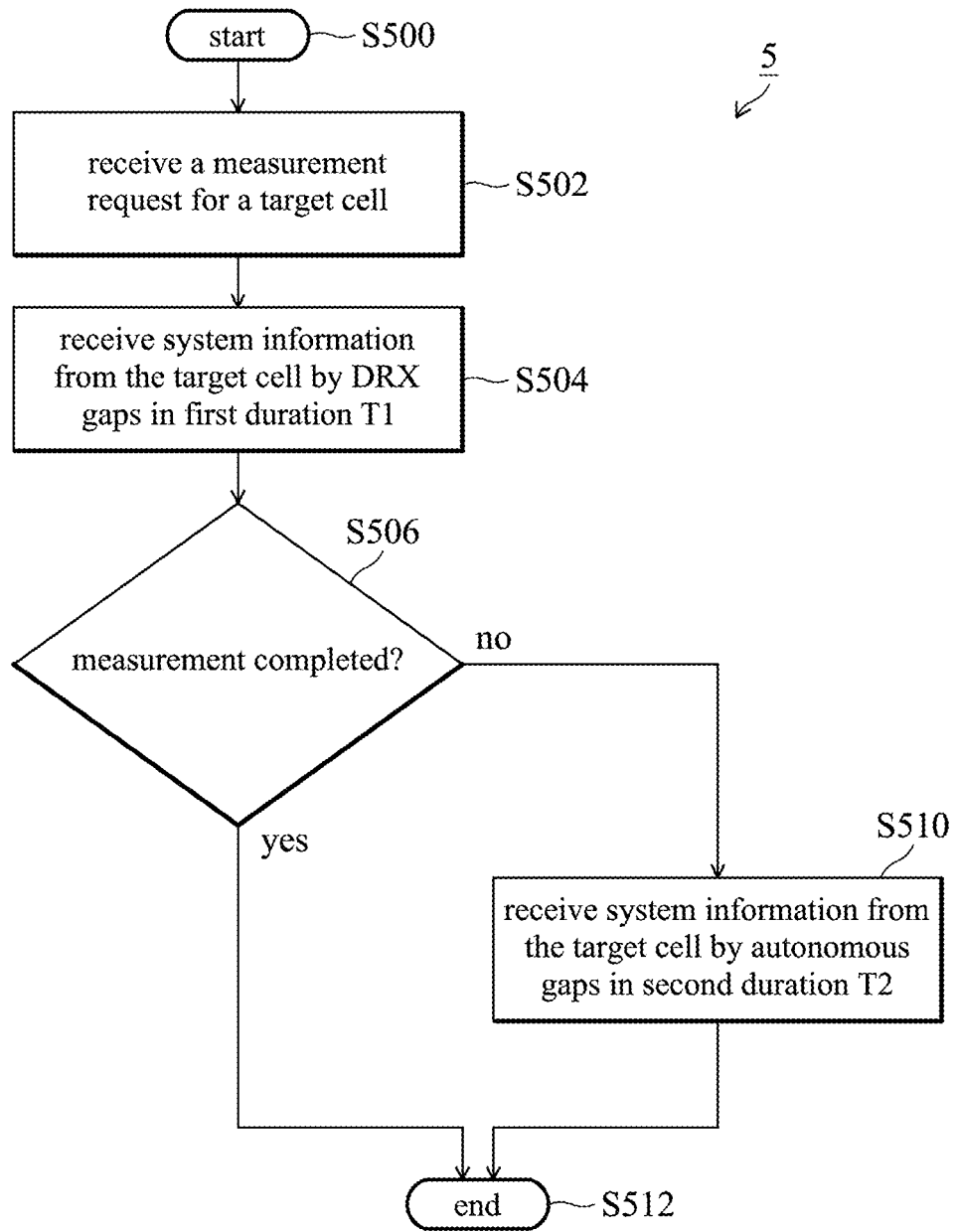
FIG. 5 is a flowchart of a measurement method 5 according to an embodiment of the invention.

In the embodiment of the invention, upon receiving a measurement request, the UE 16 is configured to use only the DRX gap for obtaining the SI or cell measurement in a first duration T1, and when the first duration T1 has been exceeded and the measurement procedure has not yet completed, the UE 16 is configured to further use the autonomous gap for obtaining the SI and cell measurement in a second duration T2. The second duration T2 is successive to the first duration T1, with a time length substantially equal to a minimal time required for retrieving all SI of the target cell. The durations T1 and T2 are adjustable by the UE 16. FIG. 3 and FIG. 5 detail the measurement procedure adopting the DRX gap in the first duration and the autonomous gap in the second duration.

Figure 4:
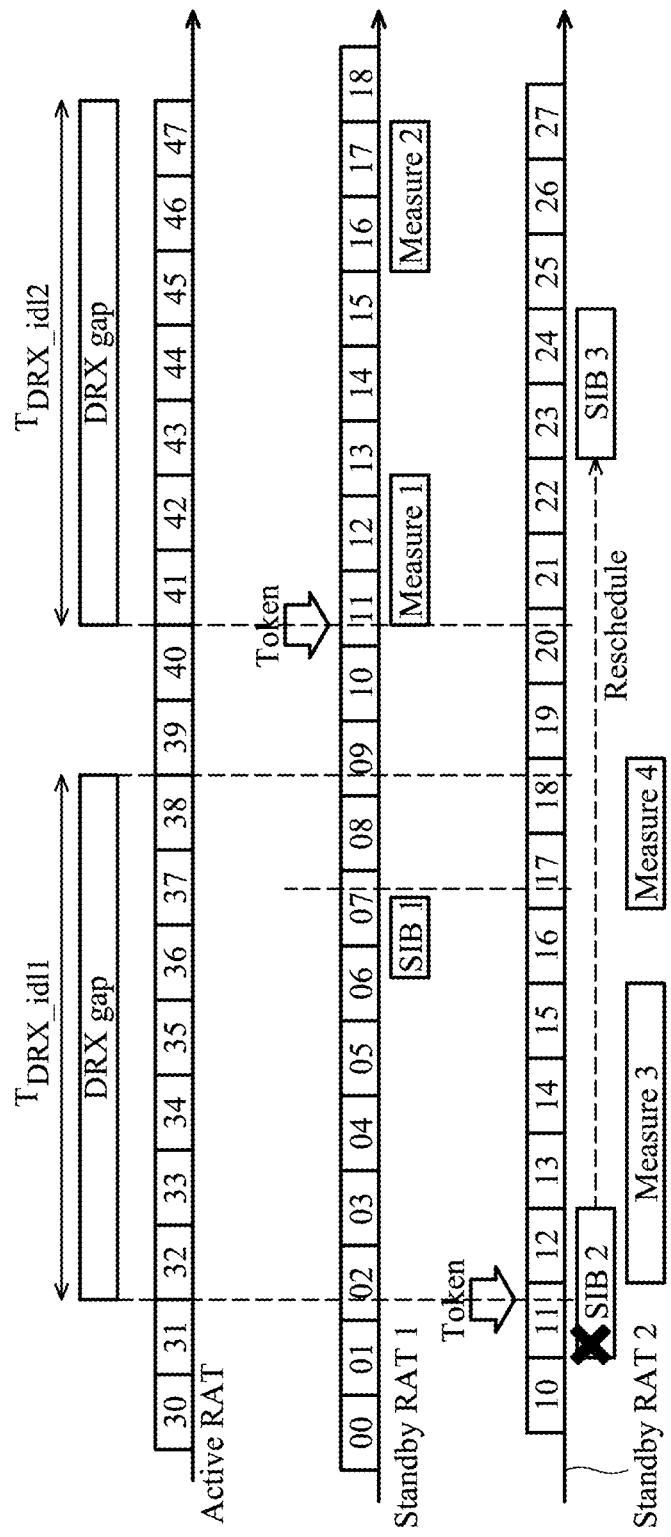
FIG. 4 is a timing diagram of a measurement procedure according to another embodiment of the invention.
Figure 6:
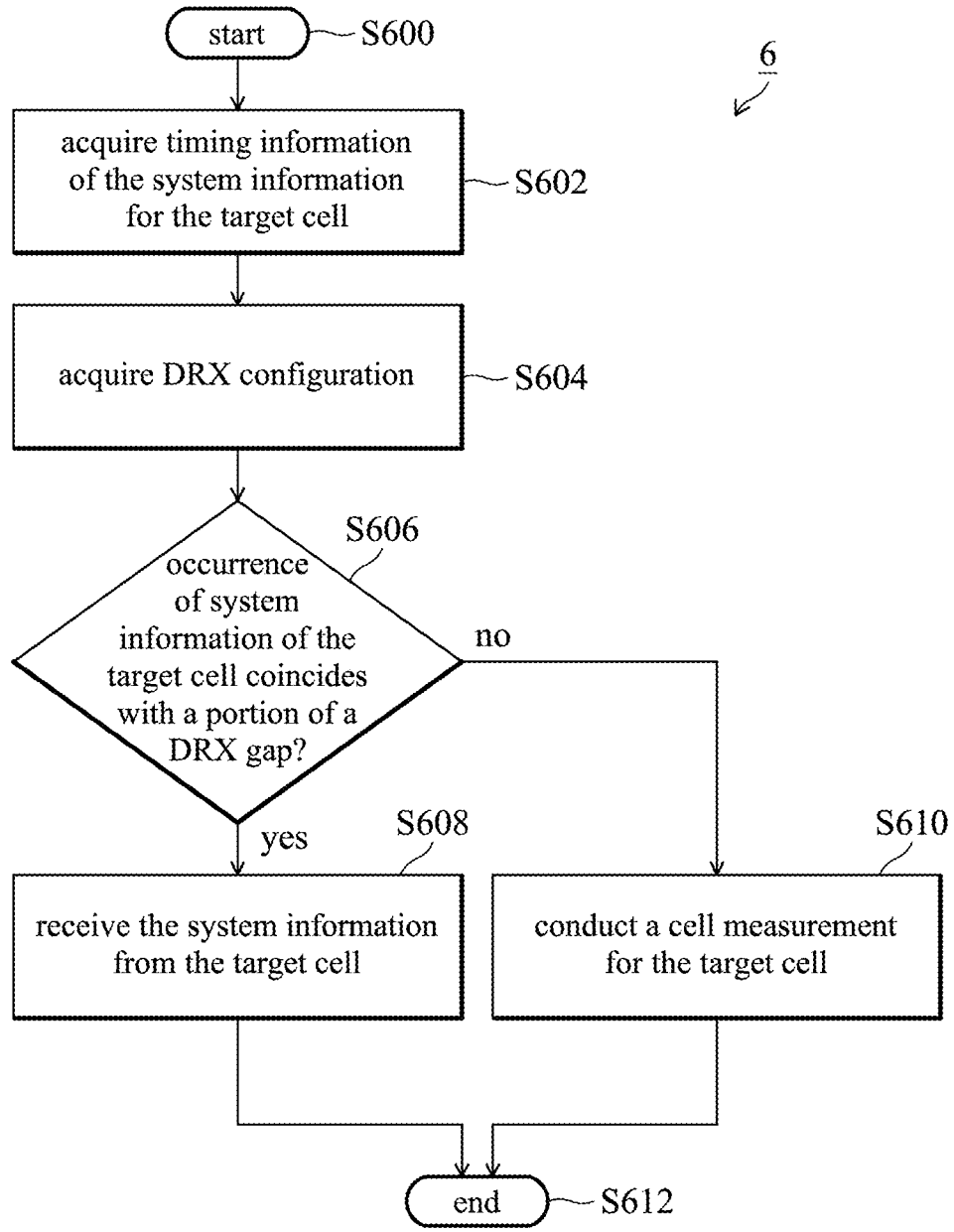
FIG. 6 is a flowchart of a measurement method 6 according to another embodiment of the invention.

In another aspect of the invention, when using the DRX gap for the measurement procedure, the UE 16 is configured to perform the SI acquisition by a higher priority than that of the cell measurement. Specifically, the UE 16 can determine whether the occurrence of the SI of the target cell will coincide with the occurrence of the DRX gap, and reserve the coincided section or portion of the DRX gap for retrieving the SI. Only when the SI is absent from the DRX gap portion can the UE 16 determine to use the DRX gap portion to carry out the cell measurement. FIG. 4 and FIG. 6 detail the measurement procedure applying higher priority of the SI acquisition than that of the cell measurement in the DRX gap.

In yet another aspect of the invention, when using the autonomous gap for the measurement procedure, the UE 16 is configured to determine the timing of the autonomous gap according to the timing of the SI and/or a channel condition in the serving cell. The measurement procedure is explained further in FIGS. 7 through 11.

The SI acquisition is described by way of examples as follows. In one scenario, the serving base station 10 issues a measurement request for the target base station 12 to the UE 16. In response, the UE 16 obtains system information including a master information block (MIB) and a system information block (SIB) in order to identify the CGI of the target cell 120. The UE 16 can do so by firstly acquiring the MIB of the target cell 120, which is transmitted repeatedly and periodically on the physical broadcast channel (PBCH) every 40 ms. For example, in E-UTRAN, the length of a radio frame is 10 ms, and the PBCH will be repeated in every frame (10 ms). The UE 16 can decode the MIB to acquire information such as system frame number (SFN) and cell transmission bandwidth to further obtain the system information block type 1 (SIB1). The SIB1 contains the ECGI transmitted with a periodicity of 80 ms on a downlink shared channel (DL-SCH). In another example, in UTRAN, the UE 16 can read MIB and then the SIB sent on a broadcast channel (BCH), and decode the CGI from the system information block type 3 (SIB3). The MIB is transmitted every 80 ms and then sustained for 20 ms. The SIB3 may have a different periodicity configured by the service network.

As for the cell measurement, the UE 16 receives downlink signals from the target base station 12, processes the downlink signals to evaluate the channel conditions of the target cell 120, and sends a measurement report containing indicators and parameters regarding the channel conditions of potential target cell 120 to the serving base station 10. In turn, the serving base station 10 can use the measurement report for various purposes such as for scheduling, mobility management, resource allocation, link adaptation, antenna selection for MIMO, and rank adaptation for MIMO. Examples of the indicators and parameters in the measurement report may be a channel quality indicator (CQI), Reference Symbol Received Power (RSRP) and Reference Symbol Received Quality (RSRQ) in E-UTRAN, and Common Pilot Channel Received Signal Code Power (CPICH RSCP) and Common Pilot channel received energy per chip divided by power spectral density (CPICH Ec/No) in UTRAN.

The measurement procedures performed in the communication system environment 1 allows the UE 16 to use DRX gaps and autonomous gaps to collect the target cell's SI and measurements in the SI acquisition time without causing disruption in the communication with the serving cell 100.

Figure 2:
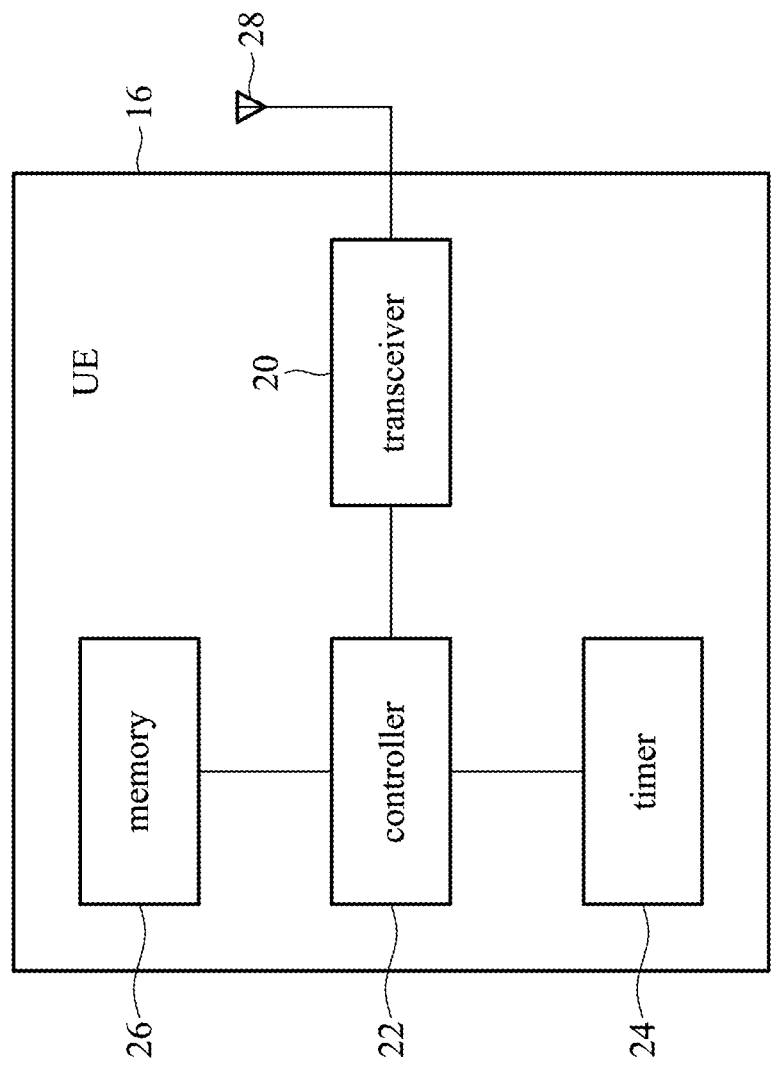
FIG. 2 is a block diagram of a UE 16 according to an embodiment of the invention.

FIG. 2 is a block diagram of the UE 16 in FIG. 1 according to an embodiment of the invention, comprising a transceiver 20, a controller 22, a timer 24, a memory device 26, and an antenna 28. The controller 22 is coupled to the memory 26, the timer 24, and the transceiver 20, which is further coupled to the antenna 28.

The transceiver 20 can receive downlink signals including control data and user data from the service network through the antenna 28. Reciprocally, the transceiver 20 can also send uplink signals including control data and user data through the antenna 28 to the service network.

The controller 22 can manage operations of the transceiver 20, the timer 24 and the memory 26, process and respond to the received control data and user data, and generate control data and user data for transmission. In particular, the controller 22 can determine system information from neighboring target cells and estimate various received signal parameters for the measurement report, such as a Channel Quality Indicator (CQI), Reference Symbol Received Power (RSRP) and Reference Symbol Received Quality (RSRQ) in E-UTRAN, and Common Pilot Channel Received Signal Code Power (CPICH RSCP) and Common Pilot channel received energy per chip divided by power spectral density (CPICH Ec/No) in UTRAN. The controller 22 can also define specific timers for various timers in the timer 24 and initiate the start and stop of each timer. For example, the controller 22 can configure a DRX duration timer in the timer 24 with the first duration T1, during which the UE 16 can perform the measurement procedure by the DRX gap The timer 24 may include a DRX cycle timer for counting a period of the DRX cycle, an On Duration timer for counting the On duration of the DRX cycle, a DRX gap for counting the DRX gap of the DRX cycle, the DRX duration timer for counting the first duration T1 for performing the measurement procedure by the DRX gaps, a MIB timer for counting a period of an MIB occurrence, and a SIB timer for counting a period of an SIB occurrence, a autonomous duration timer for counting the second duration T2 for performing the measurement procedure by the autonomous gaps, and an autonomous gap timer for counting a duration of an autonomous gap.

The memory 26 serves as a data storage for keeping data such as the DRX configuration and other data generated along the measurement procedure.

The UE 16 provides a wireless communication device for the using DRX gaps and autonomous gaps to perform SI acquisition and cell measurements of a potential target cell without causing disruption in the communication with the serving cell.

FIG. 3 is a timing diagram of a measurement procedure according to an embodiment of the invention, incorporating the system environment 1 in FIG. 1.

The timing diagram illustrates radio frames of an active RAT and a standby RAT laid out in a temporal order from left to right, where the active RAT represents the serving RAT of the serving base station 10, the standby RAT represents the neighboring RAT of the potential target base station 12. The timing diagram shows how the UE 16 responds to a measurement request and uses the DRX gaps in the first duration T1 and the autonomous gap in the second duration T2 to carry out the CGI or SI acquisition.

In the embodiment, the UE 16 receives a measurement request for the target cell 120 from the serving cell 100 before subframe 30, and correspondingly initiates the SI acquisition.

In the first duration T1, the UE 16 is configured to use only the DRX gaps to collect the SI from the target cell 12. Since the UE 16 anticipates no data from the serving cell 100 in the DRX gaps during durations $T_{DRX\_idl1}$ and $T_{DRX\_idl2}$, the UE 16 can tune to the target cell 120 for detecting the SI. As it turns out there are two SIBs in subframes 02 through 05 in the neighboring RAT, the UE 16 is able to acquire the first SIB but unable to pick up the second SIB on subframes 04 and 05, since the duration $T_{DRX\_idl1}$ has expired and the UE 16 is required to return to the serving cell 100 to receive downlink data in subframe 34. After the downlink data are decoded and is the UE 16 determines no further incoming data traffic comes from the serving cell 100, the UE 16 is configured to enter another DRX gap, switch to the target cell 120 for further SI acquisition, and obtain no further SIB in duration $T_{DRX\_idl1}$. On this point the UE 16 is configured to use the autonomous gap to continue the SI acquisition and initiate an autonomous gap accordingly.

In the second duration T2, the UE 16 is configured to use only the autonomous gaps to collect the SI from the target cell 12. The UE 16 is configured to listen to the potential target cell 120 for the SI and detect two SIBs in subframes 10 through 13 in the neighboring RAT, thus completing the SI acquisition. Nevertheless, by tuning to the potential target cell 120 during a duration $T_{AG}$, the UE 16 has missed the downlink data in subframe 42 in the serving RAT.

Communication standards have been specified a CGI acquisition time or an SI acquisition time which defines a time limit for collecting the SI of the potential target cell, decoding, and processing the collected SI, and reporting the information such as the CGI of the target cell to the serving base station. For example, in LTE, the UE is required to report the CGI of a target cell in E-UTRAN in 150 ms, the CGI of a target cell in UTRAN in 1 second, and the CGI of a target cell in other communication technology in 8 seconds. The target cell of the measurement taken may be intra-frequency or inter-frequency cell. As a consequence, the accumulation of the first duration T1 and the second duration T2 is not to exceed the CGI acquisition time.

Accordingly, the autonomous gaps created by the UE 16 to acquire the target cell 120's CGI can result in the interruption of the data transmission and reception from the serving cell 100, thus it is preferred to keep the second duration T2 of the autonomous gaps to minimal and first duration T1 of the DRX gaps to maximal to reduce the communication disruption in the serving cell 100. Thus, the UE 16 is configured to use the DRX gap for the SI acquisition in advance, and only initiate the autonomous gap when the CGI acquisition time is about to expire and the SI acquisition has not yet completed.

The second duration T2 may be a fixed value or an adaptable value. In some embodiments, the first and second duration T1 and T2 are adjustable based on the CGI acquisition time, the DRX configuration, and the SI timing. It is intended to complete the SI acquisition of the target cell within the CGI acquisition time without disrupting the communication with the serving cell. Therefore, upon startup of the SI acquisition, the UE 16 is configured to obtain the SI with the DRX gaps, determine a minimal time by which the remaining SI can all be acquired with an autonomous gap, determine the remaining time from the time of the determination to the CGI acquisition time, and switch to the autonomous duration T2 to obtain the SI with the autonomous gaps when the remaining time for the SI acquisition is just exceeding or substantially equal to the minimal time for the remaining SI acquisition. The minimal time for the remaining SI acquisition may be determined based on the DRX configuration and the SI timing. When the DRX gap occurrence coincides more with the SI occurrence, the minimal time for the remaining SI will decrease accordingly. The remaining time for the SI acquisition may be determined based on the DRX configuration and the CGI acquisition time. When the UE 16 uses longer than the DRX duration T1 for SI acquisition, the length of autonomous duration T2 will decrease accordingly. The DRX configuration is acquired from the serving cell 100 upon connection establishment. The SI timing is acquired from the MIB of the target cell 120. The CGI acquisition time is determined based on the RAT type of the target cell 120.

The measurement procedure 3 allows the UE 16 to adapt timing of DRX gaps and autonomous gaps to collect the target cell's SI and measurements in the SI acquisition time without causing disruption in the communication with the serving cell.

FIG. 4 is a timing diagram of a measurement procedure 4 according to another embodiment of the invention, incorporating the system environment 1 in FIG. 1.

The timing diagram illustrates radio frames of an active RAT and a first standby RAT 1 and a second standby RAT 2 laid out in a temporal order from left to right, where the active RAT represents the serving RAT of the serving base station 10, the standby RAT 1 and RAT 2 represent the neighboring RATs of the potential target base stations 12 and 14. The timing diagram shows how the UE 16 responds to a measurement request and uses the DRX gaps to carry out the CGI or SI acquisition and cell measurement.

In the embodiment, the UE 16 receives a measurement request for the target cells 120 and 140 from the serving cell 100 before subframe 30, and correspondingly initiates the SI acquisition and cell measurement from where subframe 32 starts. The measurement procedure of the embodiment focuses on using the DRX gaps. Two DRX gaps in duration $T_{DRX\_idl1}$ and $T_{DRX\_idl2}$ are illustrated in FIG. 4. In the two DRX gaps, the UE 16 is required to perform the SI acquisition and cell measurement for the target cells 120 and 140.

The measurement procedure 4 places a higher priority on the SI acquisition than cell measurement, i.e., when the SI is broadcasted on the air, the UE 16 is configured to carry out the SI acquisition, rather than performing the cell measurement for the target cell. When two or more target cells are requested for the measurement, the UE 16 can conduct each of the SI acquisition and the cell measurement in a round robin order, or in accordance with a proportion of the frequency bands used in each RAT.

Specifically, the UE 16 can determine the timing of the SI occurrences for the target cells 120 and 140, and conduct the SI acquisition during the DRX gap whenever the SI appear on the air. When the SI occurrences from the two target cells clashes, the UE 16 can perform the SI acquisition in a round robin manner or according to priority. For example, in the case of the round robin approach, when the UE 16 determines two SI occurrences for the two target cells 120 and 140 will appear at a time interval in the DRX gap concurrently, the UE 16 can acquire the SI for the target cell that was not acquired for in the last SI acquisition, or choose one therefrom arbitrarily when there is a lack of reference. In the case of the priority approach, each target RAT will be assigned a different priority. When two SI occurrences coincide, the UE 16 can select the target cell with the higher priority to perform the SI acquisition. If the SI occurrences from the 2 target cells coincide frequently, the lower priority SI will only have a chance of being acquired when all SIB from the higher prioritized target cell are collected.

After assigning the portions of the DRX gap to the SI acquisition, The UE 16 can assign the remaining portions of the DRX gap to cell measurements, in a round robin manner or by a proportion of the number of frequency bands in each RAT. In some embodiments, the round robin approach is adopted. In the present embodiment, the UE 16 can distribute the remaining portions of the DRX gap substantially equally to cell measurement of the target cells 120 and 140. In other embodiments, the proportion approach is implemented. The UE 16 can distribute the remaining portions of the DRX gap substantially according to the proportion of the numbers of the frequency bands in all RATs. For example, the target cell 120 may operate on 2 frequencies and the target cell 140 may operate on 3 frequencies. The UE 16 can assign the 2 out of every 5 portions in the remaining DRX gap to the cell measurement of the target cell 120, and 3 out of every 5 portions to the cell measurement of the target cell 140.

Taking the embodiment in FIG. 4 as an example, during the duration $T_{DRX\_idl1}$, the UE 16 is configured to determine the timing for the SI occurrences for target cells 120 and 140 and found that a SIB 1 will occur at subframe 07 of the neighboring RAT 1, and a SIB 2 will occur at subframe 11 of the neighboring RAT 2. The SIB 2 will not be retrieved since it starts from a time outside of the DRX gap duration $T_{DRX\_idl1}$. Consequently, the UE 16 determines to reserve a portion of the DRX gap for acquiring the SIB 1 for the target cell 120, and to perform the cell measurement for the cell 140 during subframes 12 through 15, and subframes 17 to 18. After the DRX gap, the UE 16 is configured to return to the serving cell 100 for obtaining downlink data in subframes 39 to 40 of the serving RAT.

In the second duration $T_{DRX\_idl2}$, the UE 16 is configured to determine the timing for the SI occurrences for target cells 120 and 140 and found that a SIB 3 will occur at subframes 23 to 24 of the neighboring RAT 2, and no SIB in the neighboring RAT 1. Therefore, the UE 16 can tune to the target cells 140 for collecting the SIB 3 during subframes 23 to 24 of the neighboring RAT 2 during the corresponding portion in the DRX gap. For the remaining portion of the DRX gap, the UE 16 is configured to perform cell measurements measure 1 and measure 2 for the target cell 100.

The measurement procedure 4 allows the UE 16 to schedule timing for SI acquisition and cell measurement for a target cell in a DRX gap without causing disruption in the communication with the serving cell.

FIG. 5 is a flowchart of a measurement method 5 according to an embodiment of the invention, incorporating the system environment 1 in FIG. 1 and the UE 16 in FIG. 2.

Upon startup, the UE 16 has established a connection to the serving cell 100, operating in a data transmitting mode (S500). Next, the transceiver 20 is configured to receive a measurement request for the target cell 120 from the serving cell 100 (S502). In response, the controller 22 will conduct the measurement procedure for the target cell 120. To begin the measurement procedure, the UE 16 is configured to receive the SI from the target cell 120 by the DRX gaps in the first duration T1 (S504). The DRX timer is initiated to count. The SI includes the MIBs and SIBs from the target cell 120. Upon expiration of the first duration T1, the controller 22 is configured to determine whether the SI acquisition for the target cell 120 has been completed (S506). If so, the controller 22 is not required to initiate the autonomous gap so the measurement method 5 is completed and exited (S510). If not, the controller is configured to initiate the autonomous gap for receiving the SI from the target cell 120 in the second duration T2 (S508). During the second duration T2, the autonomous gap is turned on until all SI are acquired and the measurement method 5 is completed and exited (S510).

The measurement method 5 allows the UE 16 to adapt timing of DRX gaps and autonomous gaps to collect the target cell's SI and measurements in the SI acquisition time without causing disruption in the communication with the serving cell.

FIG. 6 is a flowchart of a measurement method 6 according to another embodiment of the invention, incorporating the system environment 1 in FIG. 1 and the UE 16 in FIG. 2. The measurement method 6 may be performed independently or incorporated into Step S504 in FIG. 5.

Upon startup, the UE 16 has established a connection to the serving cell 100, and received a measurement request for the target cell 120 while operating in a data transmitting mode (S600). Next, the transceiver 20 is configured to acquire timing information of the SI for the target cell 120 by obtaining the MIBs on a broadcast channel from the target cell 120 (S602), and acquire a DRX configuration from the serving cell 100 (S604). The controller 22 may store the DRX configuration in the memory 26. The controller 22 can determine the timing of the DRX gap occurrence and that of the SI occurrence. It then follows that the controller 22 is configured to determine whether the SI occurrence coincides with a portion of the DRX gap (S606). If so, the transceiver 20 is configured to receive the SI of the target cell 120 at the portion of the DRX gap (S608). Whereas when the controller 22 determines that the SI is absent from the portion of the DRX gap, then the transceiver 20 is configured to use the portion of the DRX gap to receive the downlink signal from the target cell 120 for conducting a cell measurement (S610). The cell measurement may be carried out by the transceiver 20, controller 22, or both. After the cell measurement is completed, the transceiver 20 is configured to send the measurement results in the measurement report to the service base station 10. The measurement method 6 thus is completed and exited (S612).

The measurement method 6 allows the UE 16 to schedule timing for SI acquisition and cell measurement for a target cell in a DRX gap without causing disruption in the communication with the serving cell.

Figure 7:
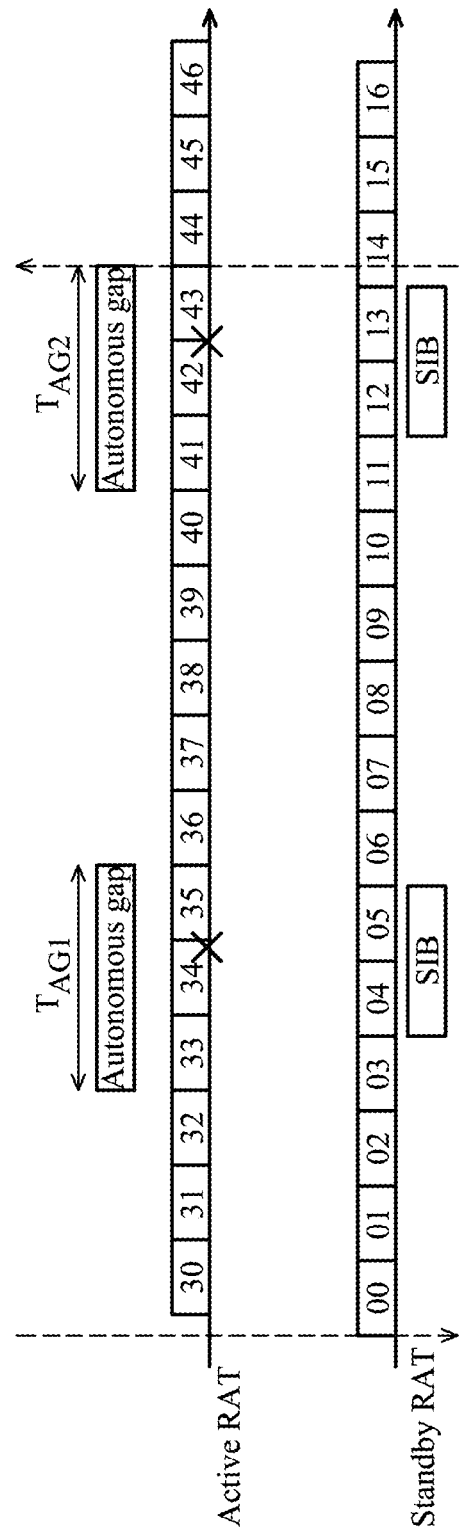
FIG. 7 is a timing diagram of a measurement procedure according to yet another embodiment of the invention.

FIG. 7 is a timing diagram of a measurement procedure 7 according to yet another embodiment of the invention, incorporating the system environment 1 in FIG. 1.

The timing diagram illustrates radio frames of an active RAT and a standby RAT laid out in a temporal order from left to right, where the active RAT represents the serving RAT of the serving base station 10, the standby RAT represents the neighboring RAT of the potential target base station 12. The timing diagram shows how the UE 16 responds to a measurement request and uses the autonomous gaps to carry out the CGI or SI acquisition.

In the embodiment, the UE 16 receives a measurement request for the target cells 120 before subframe 30, and correspondingly initiates the measurement procedure. The measurement procedure is carried out using the autonomous gaps. Two autonomous gaps in durations $T_{AG1}$ and $T_{AG2}$ are illustrated in FIG. 7.

The UE 16 is configured to initiate the autonomous gaps corresponding to the SI occurrences. The UE 16 can determine when the SI is going to be broadcasted, and schedule the initiation of the autonomous gap at a time interval coinciding with the SI occurrence. In the embodiment, the UE 16 determines that SIBs are going to appear on air at subframes 04, 05, 12, and 13 of the neighboring RAT, and therefore schedules the autonomous gaps to coincide with the SIBs during the durations $T_{AG1}$ and $T_{AG2}$. The UE 16 will miss downlink data from the serving cell 100 at subframes 34 and 42 of the serving RAT since they coincide with the autonomous gaps. Nevertheless, by keeping the autonomous gaps only as long as required, the UE 16 is able to receive the downlink data from the serving cell 100 at subframe 38 of the serving RAT between the durations $T_{AG1}$ and $T_{AG2}$.

The measurement procedure 7 allows the UE 16 to schedule timing for an autonomous gap in a DRX mode according to SI occurrence, causing minimal interruption and disruption in the communication with the serving cell.

Figure 8:
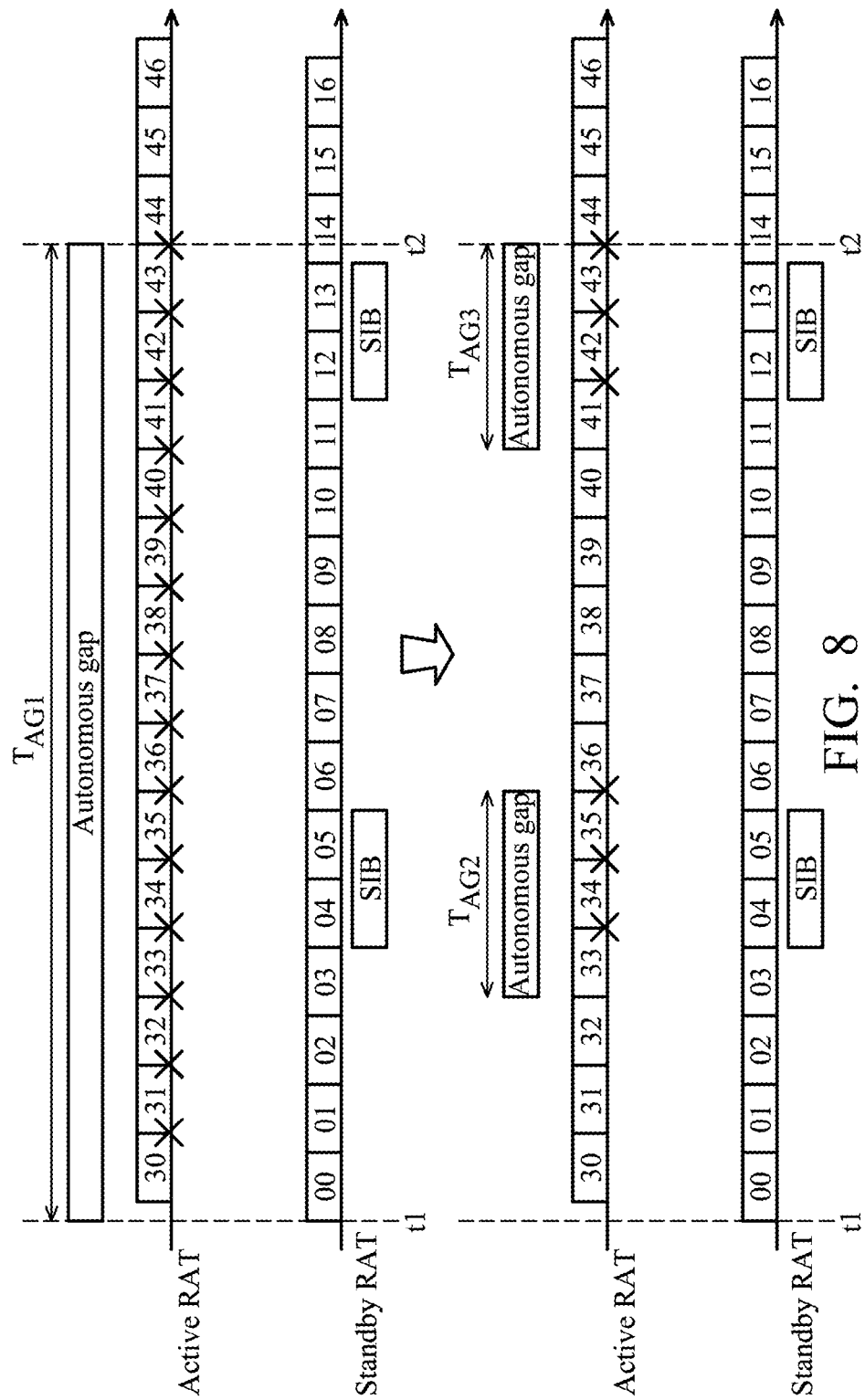
FIG. 8 shows further details of the timing diagram in FIG. 6 according to the embodiment of the invention.

FIG. 8 is a timing diagram of a measurement procedure 8 according to yet another embodiment of the invention, incorporating the system environment 1 in FIG. 1. The measurement procedure 8 is identical to the measurement procedure 7, except that rather than being operated in a DRX mode, the measurement procedure 8 is operated in a non-DRX mode, i.e., no DRX cycle is employed.

As no DRX cycle is utilized in the embodiment, UE 16 can anticipate download data in the serving cell 100 in each subframe. Since a measurement request for the target 120 has also been received, the UE 16 creates autonomous gaps in durations $T_{AG1}$ and $T_{AG2}$ for the SI acquisition. As a result, in acquiring the SI in subframes 04, 05, 12, and 13 in the target cell 120, the UE 16 will lose data in subframes 33 through 35 and 41 through 43 in the serving cell 100. Nevertheless, since the autonomous gaps only cover the durations $T_{AG1}$ and $T_{AG2}$, the UE 16 will still be able to retrieve data in subframes 36 through 40 in the interval between the two autonomous gaps from the serving cell 100.

The measurement procedure 8 allows the UE 16 to schedule timing for an autonomous gap in a non-DRX mode according to SI occurrence, causing minimal interruption and disruption in the communication with the serving cell.

Figure 9:
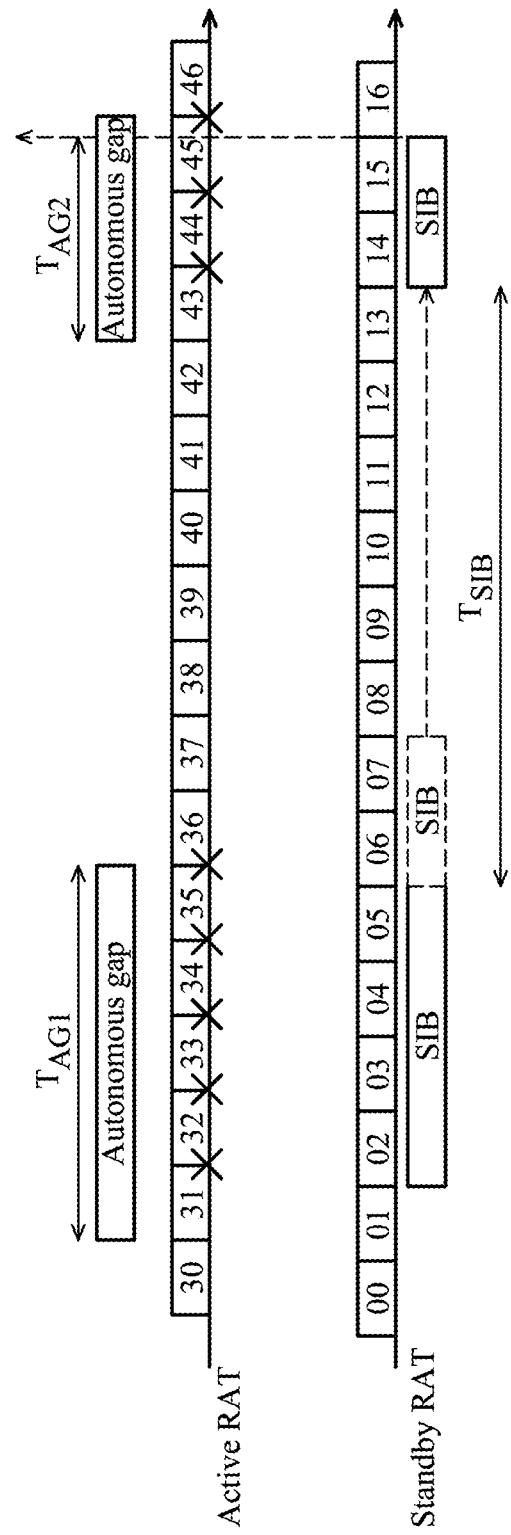
FIG. 9 is a timing diagram of a measurement procedure according to still another embodiment of the invention.

FIG. 9 is a timing diagram of a measurement procedure 9 according to still another embodiment of the invention, incorporating the system environment 1 in FIG. 1. The measurement procedure 9 is distinct from the measurement procedure 7 in that the autonomous gap duration $T_{AG}$ is limited to a predetermined gap duration, in order to keep the data throughput degradation in a controllable range.

In the embodiment, the UE 16 operates in a non-DRX mode, and the predetermined autonomous gap duration $T_{AG}$ is limited to 5 subframes of the serving cell 100. After receiving a measurement request from the serving cell 100 for the target cell 120, the UE 16 determines that the SIB occurrence being from subframes 02 through 07, or 6 subframes of the neighboring RAT, and correspondingly schedules an autonomous gap with the maximal predetermined gap duration of 5 subframes in the serving cell 100. Therefore, the SIBs contained in the 6 consecutive subframes 02 through 07 in the neighboring RAT are retrieved by two autonomous gaps, one being the first autonomous gap with the duration $T_{AG1}$, the other one being the second autonomous gap with the duration $T_{AG2}$. UE 16 can only acquire subframes 02 through 05 from the target cell 120 in the first autonomous gap, return to the serving cell 100 for retrieving subframes 36 through 42, then begin the second autonomous gap in the duration $T_{AG2}$ for acquiring the remaining SIBs in subframes 14 through 16 from the target cell 120.

It should be noted that although the embodiment employs the maximal predetermined gap duration of 5 subframes, other quantities of subframes may be used for the maximal predetermined gap duration.

The measurement procedure 9 allows the UE 16 to limit the duration of an autonomous gap, causing minimal interruption and disruption in the communication with the serving cell.

Figure 10:
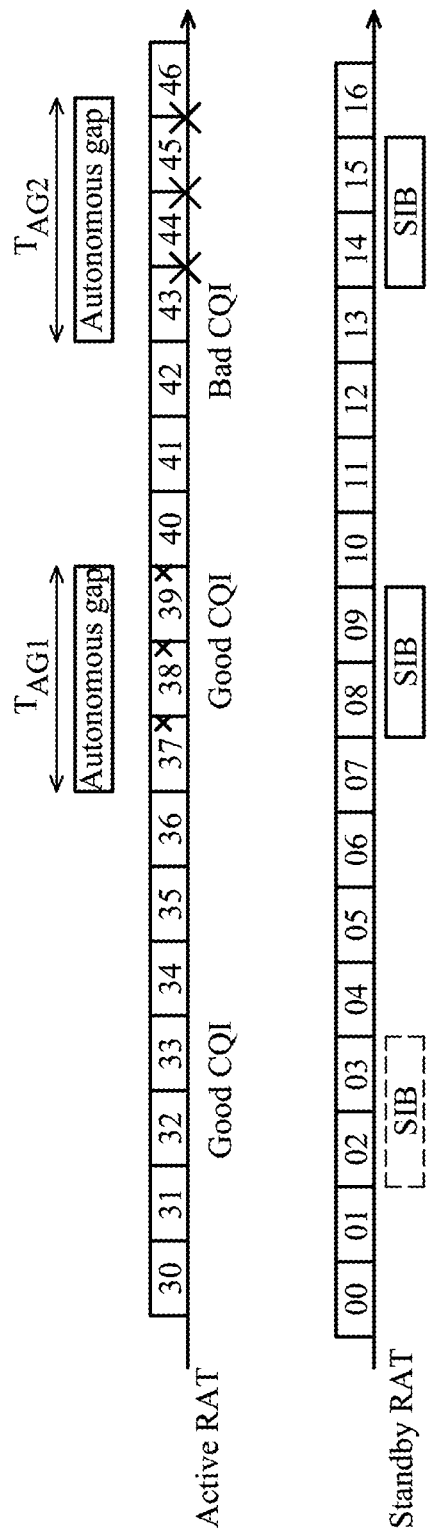
FIG. 10 is a timing diagram of a measurement procedure according to yet another embodiment of the invention.

FIG. 10 is a timing diagram of a measurement procedure 10 according to yet another embodiment of the invention, incorporating the system environment 1 in FIG. 1. The measurement procedure 10 is distinct from the measurement procedure 7 in that the UE 16 creates an autonomous gap based on both the SI occurrence and the channel condition.

In the embodiment, upon receiving the measurement request, the UE 16 is configured to determine the SI occurrence of the target cell 120, as well as the channel condition of the serving cell 100. Just before subframes 02 and 03 of the neighboring RAT, the UE 16 determines that a CQI of the serving cell 100 indicates that the channel condition of the serving cell 100 is good, therefore the UE 16 determines to continue the communication exchange in the serving cell 100 without switching to the target cell 120, missing the opportunity of acquiring the SI. Before subframes 08 and 09 of the neighboring RAT, the UE 16 determines that a CQI of the serving cell 100 indicates that the channel condition of the serving cell 100 is good, the UE 16 determines to tune to the target cell 120 for the SI acquisition since the last SI acquisition has been missed. Before the subframes 14 and 15 of the neighboring RAT, the UE 16 determines that a CQI of the serving cell 100 indicates that the channel condition of the serving cell 100 is bad. Since the data throughput in the serving cell 100 is expected to be degraded under bad channel conditions, the UE 16 determines not to continue the communication in the serving cell 100, and tune into the target cell 120 for the SI acquisition.

The UE 16 can compare the CQI to a CQI threshold for determining channel condition. When the CQI exceeds or equals the CQI threshold, the UE 16 is configured to determine the channel condition is good. When the CQI is less than the CQI threshold, the UE 16 is configured to determine the channel condition is bad. The CQI measurement may be substituted by another channel quality measurement such as the RSRP or the RSRQ.

The measurement procedure 10 allows the UE 16 to schedule timing for an autonomous gap according to a channel condition and SI occurrence, causing minimal interruption and disruption in the communication with the serving cell.

Figure 11:
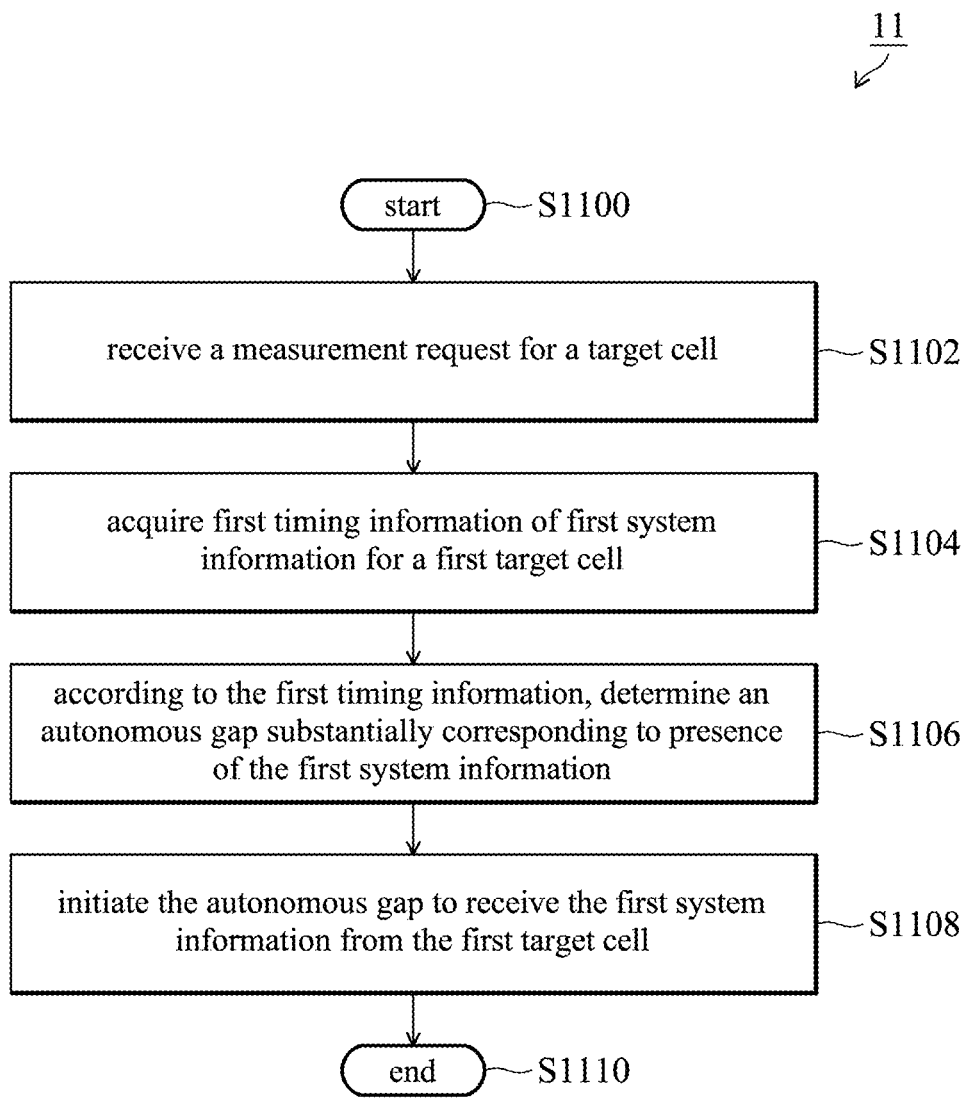
FIG. 11 is a flowchart of a measurement method 10 according to another embodiment of the invention.

FIG. 11 is a flowchart of a measurement method 11 according to another embodiment of the invention, incorporating the system environment 1 in FIG. 1 and the UE 16 in FIG. 2.

Upon startup, the UE 16 has established a connection to the serving cell 100, operating in a data transmitting mode (S1100). Next, the transceiver 20 is configured to receive a measurement request for the target cell 120 from the serving cell 100 (S1102). In response, the controller 22 will conduct the measurement procedure for the target cell 120. The transceiver 20 is configured to acquire timing information of the SI for the target cell 120 by obtaining the MIBs on a broadcast channel from the target cell 120 (S1104). The controller 22 can determine the timing of the SI occurrences (first timing information), then schedule autonomous gaps with an autonomous gap timing corresponding to the SI occurrences (S1106). According to the scheduled autonomous gap timing, the transceiver 20 is configured to initiate the autonomous gap to receive the SI from the target cell 120 (S1108). After all SI are collected by the scheduled autonomous gaps, the measurement method 11 is completed and exited (S1110)

The measurement method 11 allows the UE 16 to schedule timing for an autonomous gap according to SI occurrence, causing minimal interruption and disruption in the communication with the serving cell.

As used herein, the term "determining" encompasses calculating, computing, processing, deriving, investigating, looking up (e.g., looking up in a table, a database, or another data structure), ascertaining, and the like. Also, "determining" may include resolving, selecting, choosing, establishing, and the like.

The various illustrative logical blocks, modules and circuits described in connection with the present disclosure may be implemented or performed with a general purpose processor, a digital signal processor (DSP), an application-specific integrated circuit (ASIC), a field programmable gate array signal (FPGA) or another programmable logic device, discrete gate or transistor logic, discrete hardware components, or any combination thereof designed to perform the functions described herein. A general-purpose processor may be a microprocessor, but in the alternative, the processor may be any commercially available processor, controller, microcontroller, or state machine.

The operations and functions of the various logical blocks, units, modules, circuits and systems described herein may be implemented by way of, but not limited to, hardware, firmware, software, software in execution, and combinations thereof.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

The invention claimed is:

1. A method adopted by a mobile communication device connected to a serving cell, comprising:
   receiving a first measurement request for a first target cell;
   receiving a second measurement request for a second target cell;
   in response to the first measurement request, taking measurements for the first target cells in first frequencies;
   in response to the second measurement request, taking measurements for the second target cells in second frequencies;
   wherein the first and second frequencies are proportional to first and second numbers of frequencies adopted by the first and second target cells, respectively,
   in response to the first measurement request, acquiring first timing information of first system information for the first target cell;
   scheduling an autonomous gap corresponding to occurrence of the first system information according to the first timing information; and
   initiating the autonomous gap to receive the first system information from the first target cell;
   determining whether occurrence of the first system information coincides with a portion of a DRX gap; and
   wherein when system information for the first and second target cells are absent from the portion of the DRX gap, taking measurements for the first and second target cells in a priority order;
   when the occurrence of the first system information coincides with the portion of the DRX gap, receiving the first system information in the portion of the DRX gap.

2. The method of claim 1, further comprising:
   when the first system information for the first target cell is absent from the portion of the DRX gap, taking measurements for the first target cell in the portion of the DRX gap.

3. The method of claim 1, wherein the system information includes Master Information Block (MIB) and System Information Block (SIB).

4. The method of claim 1, wherein a length of the autonomous gap is less than 5 subframes.

5. The method of claim 1, further comprising:
   determining a channel condition of the established connection;
   wherein the initiating step comprises initiating the autonomous gap based on the channel condition of the established connection.

6. The method of claim 5, wherein the initiating step comprises determining whether the channel condition of the established connection is less than a predetermined channel condition.

7. A mobile communication device, comprising:
   a transceiver, configured to establish a connection to a serving cell, receive a measurement request for a first target cell, and receive a second measurement request for a second target cell, and wherein the transceiver is configured to take measurements for the first and second target cells in first and second frequencies, respectively; and wherein the first and second frequencies are proportional to first and second numbers of frequencies adopted by the first and second target cells, respectively; and
   a controller, coupled to the transceiver, configured to in response to the measurement request, acquire first timing information of first system information for a first target cell, schedule an autonomous gap corresponding to occurrence of the first system information according to the first timing information, and initiate the autonomous gap to receive the first system information from the first target cell, and;
   wherein when the first system information is absent from the portion of the DRX gap, the transceiver is configured to take measurements for the first and second target cells in a priority order;
   wherein the controller is further configured to determine whether the occurrence of the first system information coincides with a portion of a DRX gap; and
   when the occurrence of the first system information coincides with the portion of the DRX gap, the transceiver is configured to receive the first system information in the portion of the DRX gap.

8. The mobile communication device of claim 7, wherein:
   when the first system information is absent from the portion of the DRX gap, the transceiver is configured to take measurements for the first target cell in the portion of the DRX gap.

9. The mobile communication device of claim 7, wherein the system information includes Master Information Block (MIB) and System Information Block (SIB).

10. The mobile communication device of claim 7, wherein a length of the autonomous gap is less than 5 subframes.

11. The mobile communication device of claim 7, wherein:
   the controller is further configured to determine a channel condition of the established connection; and
   the controller is configured to initiate the autonomous gap based on the channel condition of the established connection.

12. The mobile communication device of claim 11, wherein the controller is configured to determine whether the channel condition of the established connection is less than a predetermined channel condition.

13. The mobile communication device of claim 7, wherein the priority order is a round robin order.

* * * * *